July 9, 1935.  F. SCHELBEN  2,007,504
TRAILER
Filed Dec. 7, 1934  2 Sheets-Sheet 1
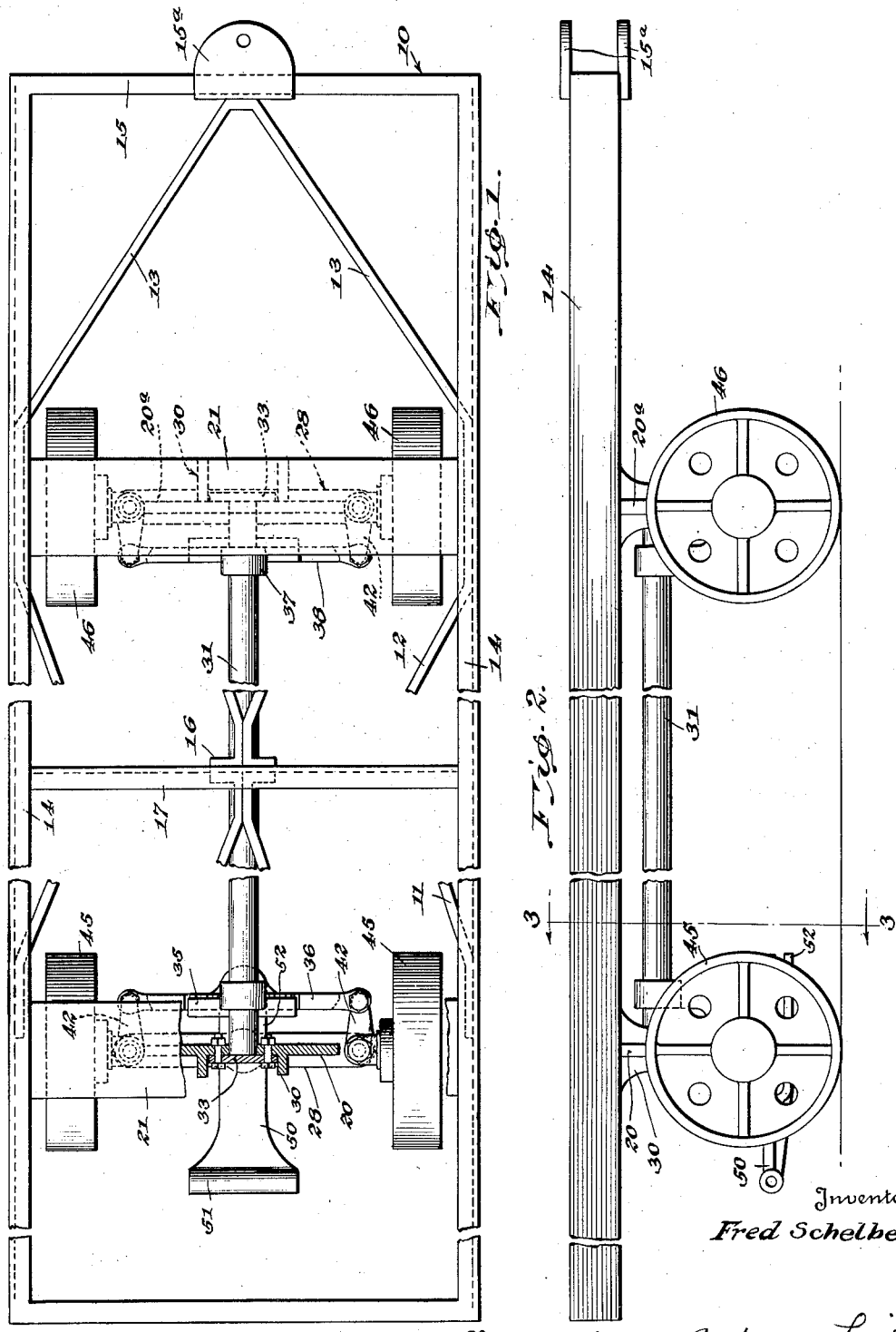
Inventor
Fred Schelben July 9, 1935.   F. SCHELBEN   2,007,504
TRAILER
Filed Dec. 7, 1934   2 Sheets-Sheet 2
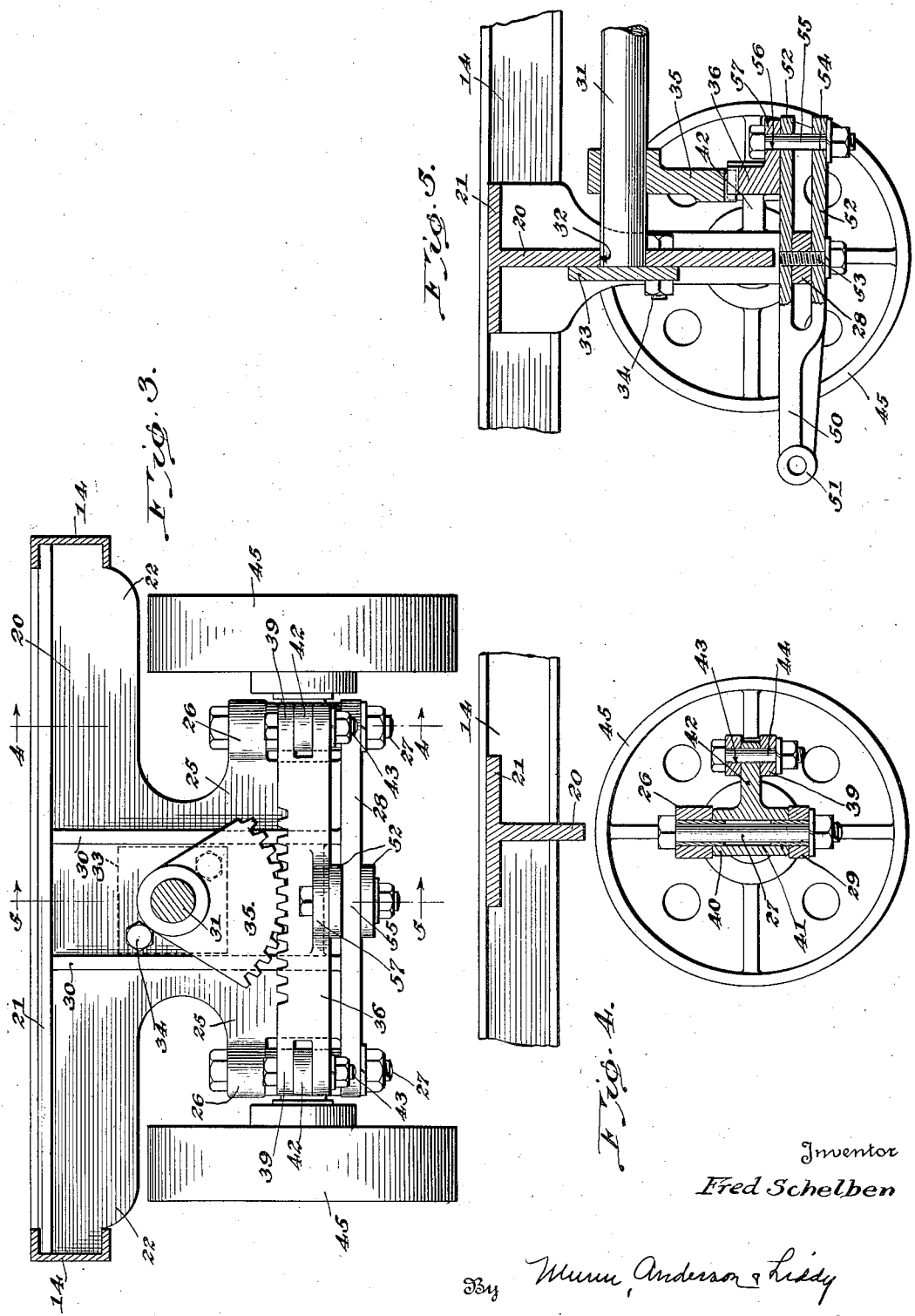
Inventor
*Fred Schelben*
By *Munn, Anderson & Liddy*
Attorneys Patented July 9, 1935

2,007,504

UNITED STATES PATENT OFFICE 2,007,504

TRAILER

Fred Schelben, Greenville, Miss.

Application December 7, 1934, Serial No. 756,556

2 Claims. (Cl. 280—33.55)

This invention relates to trailers.

An object of the invention is the provision of a trailer in which both the front and rear wheels are turned in synchronism by the movement of the tongue while the mechanism for causing turning of the wheels positively maintains the wheels in alignment during direct travel along the roadbed.

Another object of the invention is the provision of a trailer in which racks and segmental gears are operated simultaneously for turning the wheels of the trailer in accordance with the turning or angles of oscillation of a tongue which causes reciprocation of the racks for not only positively operating the wheels but for maintaining the wheels in direct alignment with the roadbed, the co-operative turning mechanism for whole sets of wheels being located interiorly of the framework and protected by said framework against injury.

A further object of the invention is the provision of a trailer adapted for commercial use in which all of the parts are constructed of material which will stand the usage and in which the front and rear wheels of the trailer are positively and simultaneously maintained in alignment along the roadbed, a tongue being provided for causing oscillation of a rack which through segmental gears and a rockable shaft provides for simultaneous movement of a second rack for controlling the turning of the rear wheels, the racks being co-operatively connected with the pivotal mountings for the wheels whereby said wheels are turned through reciprocation of the racks.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

In the drawings:

Figure 1 is a plan view of a trailer partly in section constructed in accordance with the principles of my invention, Figure 2 is a side view in elevation of the trailer, Figure 3 is a transverse vertical section taken along the line 3—3 of Figure 2, Figure 4 is a fragmentary longitudinal section taken along the line 4—4 of Figure 3, and Figure 5 is a fragmentary longitudinal vertical section taken along the line 5—5 of Figure 3.

Referring more particularly to the drawings, 10 designates generally a body supporting frame which is preferably rectangular in shape and has reinforcing bars 11, 12 and 13. The bars 13 are connected with the side bars 14 and with the rear end bar 15. The bars 11 and 12 are diagonally disposed and extend from the side bars 14 to a central plate 16 connected to a transverse bar 17 which has its ends connected to the side bars 14.

A front axle 20 is disposed vertically at the forward end of the frame and is in the form of a T beam having a horizontally disposed flange 21 connected to the side bar 14. The axle per se has its outer projecting ends 22 welded or secured to the side bars 14 in any approved manner.

The lower end of the axle 22 is provided at each side edge with an extension 25 which has a bearing 26 for a king pin or bolt 27.

A bar 28 is secured to the bottom of the axle 20 and is provided with bearings 29 at its opposite ends to receive the bolt 27.

The outer face of each axle 20 or 20ᵃ is provided with a pair of ribs 30 which extend vertically from the plate 21 to the bar 28. These ribs may be formed integrally with the axle or may be connected thereto in any approved manner.

The rear axle 20ᵃ has substantially the same construction as the front axle 20 and therefore the same numerals have been applied to the rear axle to represent similar parts.

A rock shaft 31 extends longitudinally and centrally of the frame 10 and has its ends mounted in openings 32 in the axles 20 and 20ᵃ, the openings forming bearings for said shaft. A plate 33 is bolted at 34 to the outer face of each axle with the free ends of the shaft abutting said plates for maintaining the shaft in position. It will be noted from Fig. 3 that the plate 33 is rectangular in shape and fits between the pair of ribs 30 so that these ribs not only form a reinforcing means for the axles but also co-operate to prevent lateral movement of the plate.

A segmental gear 35 is secured to the forward end of the rock shaft 31 and meshes with a reciprocating rack 36. A segmental gear 37 is secured to the rear end of the rock shaft 31 and meshes with a reciprocating rack 38.

A mounting for each of the wheels is shown more particularly in Fig. 4 and it consists of a sleeve 40 disposed between the bearing 26 and the bearing 29. The sleeve is provided with an annular chamber 41 to provide for lubrication of the king pin 27 and respective bearings 26 and 29.

An arm 42 formed integrally with the sleeve 40 extends inwardly from the sleeve and is provided with a passage 43 to receive a bolt 44 carried by the bifurcated portions 39 at the end of each of the racks 35 and 38. Thus it will be seen that oscillation of the racks will cause rocking of the arms 42 and therefore turning of the wheels 45 and 46 of the trailer.

A tongue, generally designated by the numeral 50 has means 51 at its forward end whereby it may be connected to an automobile or truck. The inner end of the tongue is in the form of a prong having arms 52 which are spaced from each other to receive the bar 28. A bolt 53 pivotally connects the tongue or the arms 52 with the bar 28 whereby said tongue may be oscillated. The inner ends of the arms 52 of the tongue are provided with passages 54 adapted to receive a bolt 55. This bolt is inserted through a passage 56 formed in an extension 57 at the inner face of the rack 36. By this construction the inner end of the tongue 50 is pivotally connected with the rack 36 to cause reciprocation of said rack.

It will be noted that the teeth of the segmental gear 35 are wider than the teeth of the rack 36 and this is also true of the segmental gear 37 and the rack 38 since the rack 36 is moved inwardly and outwardly of the inner face of each of the axles when reciprocated due to the fact that the arms 42 of the wheel mountings are connected to the racks.

The operation of my device is as follows: When the trailer is attached to a truck and the truck is moving along a roadbed which is substantially straight, the tongue 50 will be maintained in longitudinal alignment with the center of the truck and the trailer and therefore the segmental gears 35 and 37 will positively hold the racks in such a position that the wheels will be maintained in alignment along straight lines.

When, however, the trailer turns to the right the wheels 45 will likewise be turned to the right but the rear wheels are turned to the left so that when the trailer goes around a corner the rear wheels will move the rear portion of the body outwardly from the inner corner so that the body will make the proper turn. As soon as the body again begins to move towards a straight line along the roadbed, the wheels will be aligned as before.

When the tongue is moved to the right the racks 36 and 38 will be shifted to the left and the segmental gears will be rocked towards the left.

It is to be borne in mind that while the rack 36 is positively reciprocated by the tongue 50 the rack 38 is shifted in a similar direction by the segmental gear 37 due to the rocking of the shaft 31.

A connector 15ª for an additional trailer is in the form of a pair of perforated parallel plates secured to the rear bar 15 of the frame 10.

I claim:—

1. A trailer comprising front and rear axles formed of T-beams, each outer face of the axles being provided with vertically disposed reinforcing ribs, each axle having a bearing opening located between the ribs, a rock shaft having the ends mounted in the bearing openings, a plate secured to each axle between the ribs and against which an end of the rock shaft abuts, a segmental gear secured to the shaft adjacent each end of said shaft, a rack in mesh with each gear, wheels having pivotal mountings on the ends of the axles, means connecting the ends of the racks with the pivotal mountings so that when the racks are reciprocated the wheels will be turned, and a tongue connected with the front rack for causing reciprocation of both racks.

2. In a trailer having front and rear axles rigidly connected together, a bar disposed adjacent the lower portion of each axle and spaced therefrom, a wheel mounting pivotally connected on each end of the bar and to an adjacent portion of each axle, a tongue having a forked inner end receiving the bar attached to the front axle, means for pivotally connecting the forked end of the tongue to said bar, a rack bar located in parallel relation with the lower portion of each axle, and means connecting the end of each rack bar to the adjacently disposed wheel mounting, and means operatively connecting the rack bars together for simultaneous actuation.

FRED SCHELBEN.